(12) United States Patent
Freeman

(10) Patent No.: US 6,293,631 B1
(45) Date of Patent: Sep. 25, 2001

(54) CRAWLER SPROCKET DRIVE GUARD

(76) Inventor: Ernie Freeman, 3467 Kings Mill Run, Rocky River, OH (US) 44116

( * ) Notice: Subject to any disclaimer, the term of this patent is extended or adjusted under 35 U.S.C. 154(b) by 0 days.

(21) Appl. No.: 09/611,470

(22) Filed: Jul. 7, 2000

Related U.S. Application Data

(63) Continuation-in-part of application No. 09/324,666, filed on Jun. 3, 1999.

(51) Int. Cl.$^7$ .................................................. B62D 25/16
(52) U.S. Cl. ............................................................ 301/107
(58) Field of Search .............................. 305/110, 100, 305/107, 109, 115; 404/129; 172/610

(56) References Cited

U.S. PATENT DOCUMENTS

| | | | |
|---|---|---|---|
| 1,812,543 | * 6/1931 | White | 305/107 |
| 2,146,882 | 2/1939 | Baker et al. | 305/109 |
| 3,861,762 | 1/1975 | Freedy et al. | 305/12 |
| 3,912,336 | 10/1975 | Ritter Jr. et al. | 305/12 |
| 5,676,493 | * 10/1997 | Brockway | 404/129 |
| 5,713,644 | 2/1998 | Freeman | 305/110 |
| 5,733,020 | 3/1998 | McCartney et al. | 305/107 |
| 5,820,230 | * 10/1998 | Freeman | 305/107 |
| 5,951,123 | 9/1999 | Bomstad et al. | 305/107 |
| 6,019,443 | 2/2000 | Freeman | 305/110 |

* cited by examiner

Primary Examiner—S. Joseph Morano
Assistant Examiner—Long Bao Nguyen
(74) Attorney, Agent, or Firm—Pearne & Gordon LLP

(57) ABSTRACT

A guard for off road vehicles to protect the final drive area from debris which otherwise causes destructive abrasion and seal failure and particularly suited for the final drive of a track chain sprocket on a crawler. The guard encloses the space surrounding the final drive spindle housing and seal between the housing and a hub on which the sprocket is mounted. The guard can be safely installed on existing machines without disassembly of major parts of the final drive.

75 Claims, 7 Drawing Sheets

CRAWLER SPROCKET DRIVE GUARD

This application is a continuation-in-part of application Ser. No. 09/324,666, filed Jun. 3, 1999.

BACKGROUND OF THE INVENTION

The invention relates to improvements for land vehicles such as off road equipment and, in particular, to guards for the drive of wheels or sprockets for the same.

U.S. Pat. No. 5,713,644 illustrates a cutter device to reduce wear and tear on the final drive of a crawler such as manufactured Caterpillar, Inc. This cutter device is especially useful on machines operating on landfills that accept residential and commercial refuse, for example. Landfill environments present severe service conditions on machinery due to the mix of debris typically found at such sites. Material over which a machine runs tends to be drawn up and around rotary parts eventually leading to excessive wear through abrasion and oftentimes to catastrophic failure because of destruction of seals between parts rotating relative to one another. A need exists for a device that can protect drive areas of equipment of the type described in landfills, construction sites and other off road situations where the environment is adverse and that provides an alternative to the cutter device disclosed in the aforementioned patent for situations that are less than extreme.

More specifically, rotating drive wheels in the form of track chain sprockets, for instance, rotate relative to their support housings and normally have associated seals to protect bearings and gears within the housings that support the sprocket hubs for rotation. The housings are subject to high wear rates through abrasion by debris entwined on the rotating parts. This debris eventually can wear through the walls of the housing causing catastrophic failure of bearings and related parts.

Where a seal on a final drive of a crawler is damaged prematurely by intrusion of debris, the cost to repair the same may range, by way of example, between $3,000 to $4,000. Wear on a final drive housing or sprocket hub can cost as much as $7,000 to $8,000 in repair. A loss of oil from a damaged seal can result in repair work for internal damage of as much as $50,000.

It is desirable, especially for large machines where the major drive components are too heavy to be manipulated by hand, that any protective guard be capable of being installed without dismantling and reinstalling such major components of the machine.

SUMMARY OF THE INVENTION

The invention provides a guard for drive assemblies of commercial land vehicles such as track mounted machines sometimes referred to as crawlers. Chain sprockets for the track are rotatably supported on housings at opposite sides of a crawler. In the disclosed embodiment, the guard extends between a fixed housing on the main body or frame of the machine and the hub supporting a track chain sprocket. The guard preferably has a relatively large diameter so it occupies most of the space available adjacent the path of the track chain. This geometry advantageously limits the amount of debris that can accumulate on the sprocket adjacent the rotating areas.

An important aspect of the invention is the ability of the guard to be installed on a machine without requiring disassembly and reassembly of major parts of the final drive system. The disclosed guard shares the original mounting bolt locations of the drive system but is configured to allow at least some of the mounting bolts to remain in place at locations circumferentially spaced around the axis of rotation of the sprocket while the guard is being installed. This feature ensures that various drive line parts will be safely held in place without being stressed in a manner that could cause physical damage or even bodily injury.

Another important feature of the invention is the provision of telescoping parts that enable the entire gap between the housing and sprocket to be protected from entry of debris. The telescoping guard portions in the illustrated embodiment have a labyrinth-like configuration which reduces the risk that debris could work its way into the guard.

The disclosed guard has demonstrated remarkable effectiveness in protecting the seals of the sprocket drive while achieving excellent durability. All of the reasons for the performance of the guard are not yet fully understood, but it is believed that major factors are related to the relatively large diameter of the guard in comparison to the diameter of the sprocket. First, since the circumference of the guard is relatively long, the risk that a strand of cable, rope, wire, strapping, fabric or the like will be long enough to wrap numerous times around the guard is reduced. Second, the close proximity of the guard to the underside surfaces of the track apparently allows the system to be self-cleaning such that the track "scrubs", in a non-contact manner, the external surface of the guard. The smooth character of the circular guard in the circumferential direction, additionally, appears to play a role in the anti-wrapping and durability performance.

DESCRIPTION OF THE PREFERRED EMBODIMENTS

Figure 1:
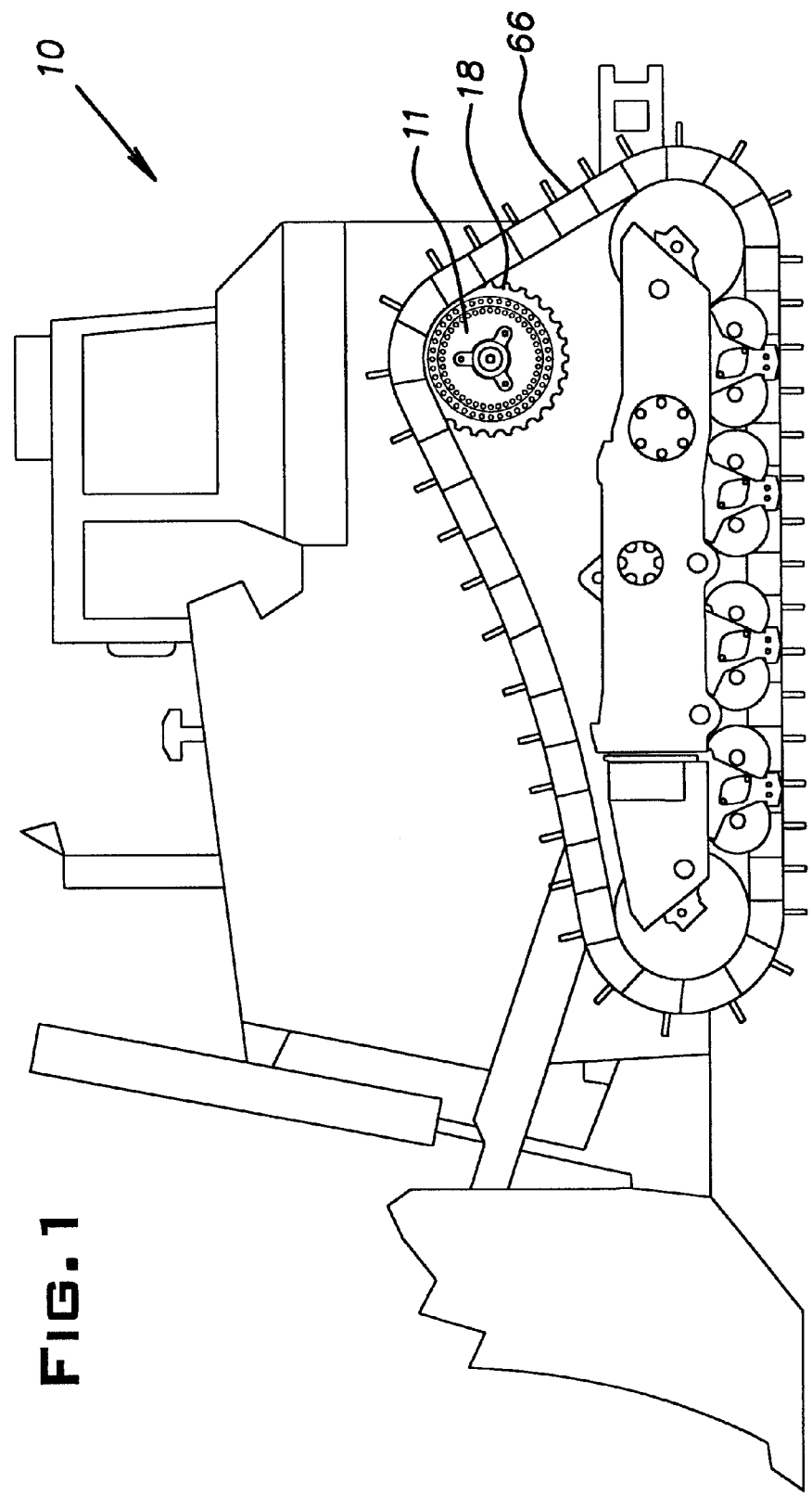
FIG. 1 is a somewhat schematic side elevational view of a track mounted machine or tractor embodying the invention.
Figure 2:
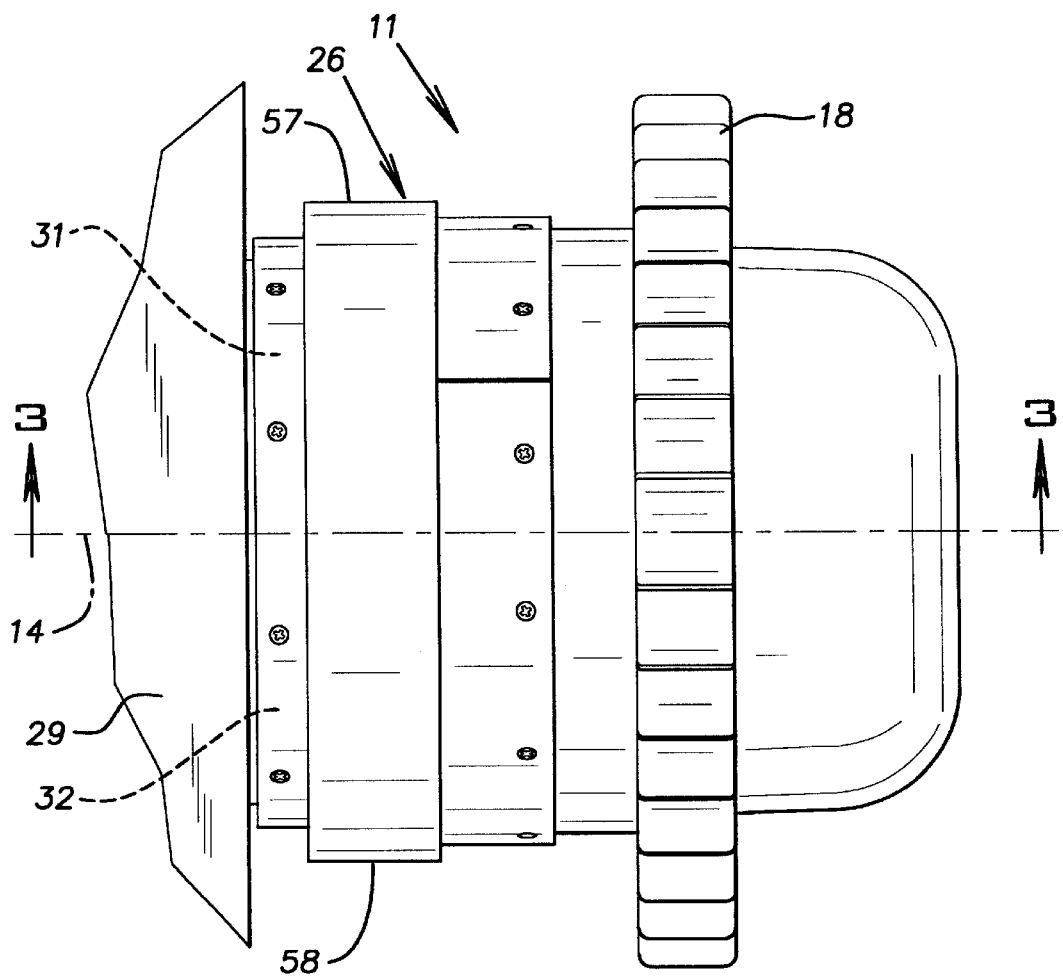
FIG. 2 is a fragmentary elevational view, taken from the rear, of the final drive system of the right side of the tractor protected by the guard of the invention.

Referring now to the drawings and in particular to FIG. 1, there is shown a land vehicle 10 in the form of a track mounted machine or crawler. The illustrated machine can represent the type of crawler design manufactured by Caterpillar, Inc. and referred to as a High Drive model. The machine 10 is of a known construction and has a prime mover, typically a diesel engine, and a drive train which includes a pair of final drives 11 represented by a spindle housing 12 and a hub assembly 13 on each side of the machine 10. The hub assembly 13 rotates about an axis 14. The non-rotating spindle housing 12 is a circular bell-shaped structure that is fixed on the machine frame, designated 29, by bolts 16. The bolts 16 are generally evenly spaced in a circular pattern concentric with the axis 14 and extend through a flange 17 of the housing 12.

The hub 13 carries a sprocket 18 that is in the form of a plurality of arcuate segments 19. The sprocket segments 19 are fixed to a flange 21 of the hub 13 by a plurality of bolts 22. The bolts 22 are assembled axially through holes in the segments 19 and the hub flange 21 generally evenly spaced about the circumference of the hub. The end of an extension 23 of the hub 13 lies adjacent the housing 12 and a seal assembly generally indicated at 24 and known in the art is disposed between these elements to accommodate rotation of the hub 13 with its extension 23 relative to the housing 12 while sealing lubricant in these parts and excluding environmental debris, dust, water and the like.

The invention provides a guard 26 which in a preferred embodiment is fabricated as a weldment of steel plate and bar. The guard 26 includes two generally circular base portions 27, 28. An inboard base portion 27 is associated with the spindle housing 12 and frame 29 of the machine 10 while the outboard base portion 28 is associated with the rotating sprocket 18 and hub 13. Both the inboard and outboard base portions 27, 28 are split approximately in halves for purposes of installation.

The inboard guard base portion 27 has mating semi-circular halves 31, 32. The halves 31, 32, have their main bodies 30 rolled from steel plate stock and have an internal semi-circular radial flange 33 spaced a predetermined distance away from an associated end 34. Each flange 33 has holes 36 that align with mounting holes in the housing flange 17. On the external face of the flange 33 are welded or otherwise fixed a plurality of apertured spacers 37 in registry with the holes 36. The spacers 37 are at least as long in the axial direction as the heads of the bolts 16 mounting the spindle housing 12. The holes in the flange 33 and spacers 37 are sized to receive bolts of the same diameter as the bolts 16 mounting the spindle housing 12.

Figure 5:
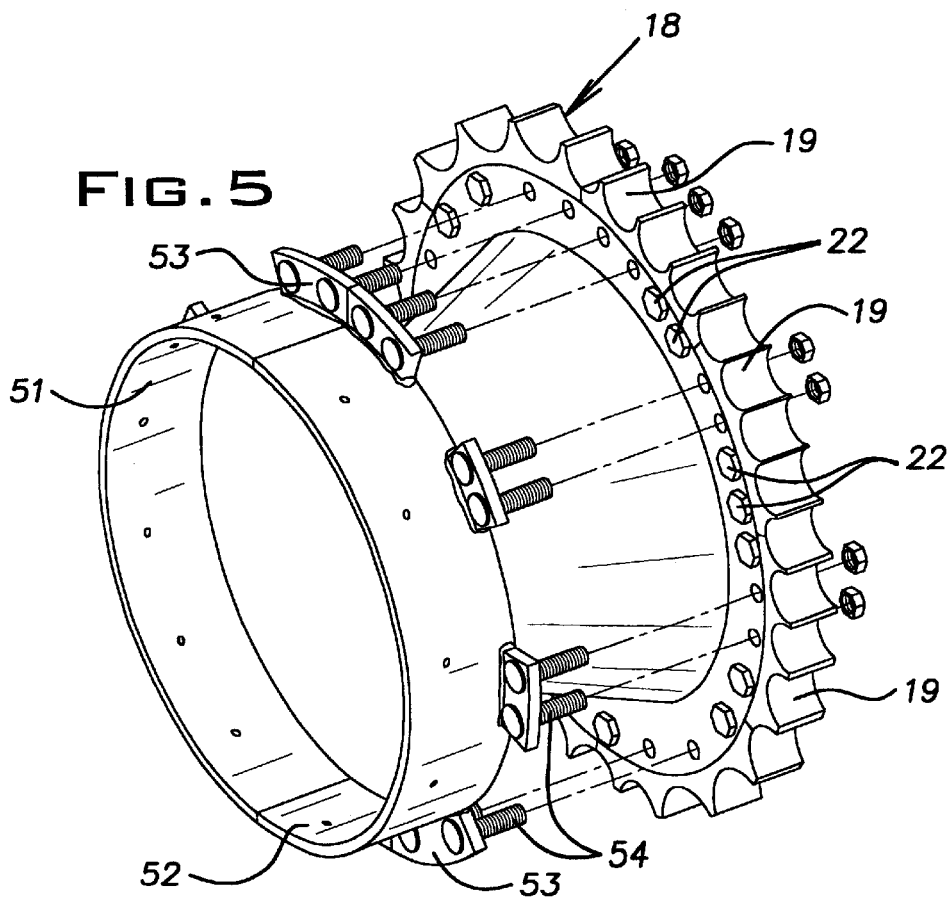
FIG. 5 is an exploded perspective view of an outboard base portion of the guard mounted with the rotating parts of the final drive system.

FIG. 5 illustrates details of the generally cylindrical outboard base portion 28 which is comprised of two similar mating half shells 51, 52 fabricated primarily of steel plate. At their outer ends, the shells 51, 52 have external radial flanges or brackets 53 that are located at pre-determined spaced locations about the periphery or circumference of the guard base portion 28. The flanges 53 have bolts 54 that align with holes in the hub flange 21 used to mount the sprocket segments 19. The bolts 54 have shallow heads for clearance of the track chain and are preferably welded to the flanges 53.

Figure 6:
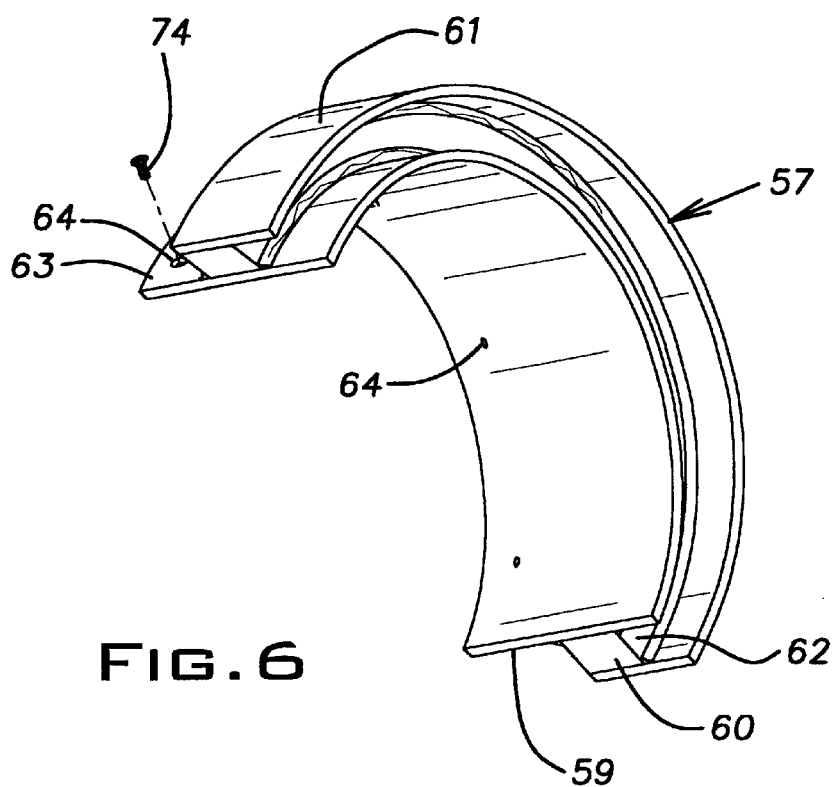
FIG. 6 is a perspective view of an inboard shield half section.
Figure 7:
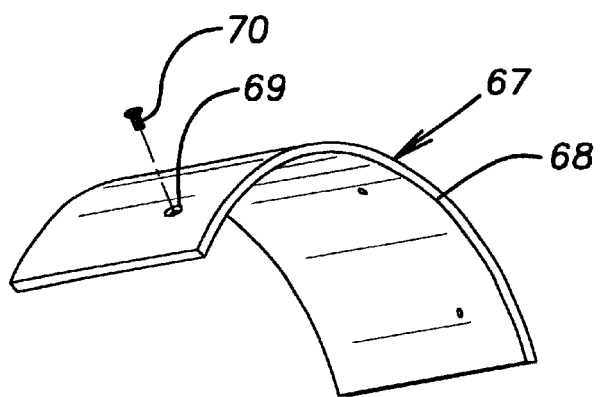
FIG. 7 is a perspective view of an outboard shield plate.

The guard includes an inboard shield 56 conveniently formed as a mating pair of similar generally semi-circular parts 57, 58. These parts 57, 58 have the same cross section when viewed in a plane parallel to the axis 14 as in FIG. 3. One of the parts 57 is illustrated in FIG. 6 and includes an inner semi-cylindrical steel plate 59, a spacer bar 60 rolled into a semi-circular shape and a semi-cylindrical outer steel plate 61. These pieces 59–61 are welded together so that the outer plate 61 is radially outward of and concentric with the inner plate 59 and a cylindrical groove 62 is formed between these plates. An inboard side of the inner plate 59 extends axially away from the bar 60 and the outer plate 61 leaving its outer surface area 63 uncovered. A plurality of circumferentially spaced countersunk holes 64 are formed in the inboard side of the inner plate 59 through the surface 63. The holes 64 are located so that they can be aligned with threaded holes 65 in the inboard base portion 27. Flat head socket type bolts 74 are assembled flush in these holes 64, 65 to retain the shield parts 57, 58 on the inboard base portion 27. The inner surface of the inner plate 59 has a radius substantially equal to the outer radius of the base portion 27.

The guard 26 has an outboard cylindrical shield 67 made of a plurality of steel plates 68. The plates 68 have plain cylindrical segment configurations and an inside radius substantially equal to the outside radius of the outer surface of the outboard base 28. These shield plates 68 have countersunk holes 69 that align with threaded holes 72 in the outboard base portion 28 and receive bolts that retain the plates in place on the outboard base. The bolts 70 can be flat head socket type fasteners that fit with their heads flush in the countersunk holes 69.

The guard 26 is provided over the final drive 11 on each side of the machine 10. The disclosed guard 26 has the ability to be safely installed without disassembly of the track, designated 66, sprocket 18 or hub 13. The inboard guard base portion 27 is assembled by first removing a limited number of bolts 16 that mount the spindle housing 12 to the machine frame 29 leaving at least about half of these bolts in place generally evenly distributed about the circumference of the housing 12. The particular bolts 12 that are removed are determined by the positions of the spacers 37, the bolts being removed where the spacers exist. The base portion halves 31, 32, are put in position and longer substitute bolts 71 are assembled through the flanges 33, spacers 37 and spindle housing flange 17 and are suitably tightened.

The outboard guard base portion 28 is installed in place after the inboard base portion 27 is installed as just described. A limited number of sprocket segment mounting bolts 22 at locations around the sprocket 18 are removed. The bolts 22 are removed at locations corresponding to the flanges 53 and bolts 54 on the shell halves 51, 52. Nuts on the outside of the sprocket segments 19 are suitably tightened onto the bolts 54. It will be seen that the flanges 53 and bolts 54 are arranged to leave at least about half of the original bolts 22 in place distributed around the circumference of the sprocket so that the sprocket segments 19 are safely held in place during this installation process.

The inboard shield 56 is mounted on the inboard base 27 and retained, as indicated above, by the bolts 74. The bolt holes 64, 65 are arranged to permit the joints between the shield halves 57, 58 to be angularly spaced from the joints between the base halves 31, 32 so as to rigidify this assembly. Thereafter the outboard shield plates 68 are mounted on the outboard base 28 with portions received in the annular groove 62. The respective holes 69 in the plates 68 are arranged relative to the holes 72 in the outboard base such that the joints between them are angularly displaced from the joints between the base halves 51, 52 thereby rigidifying this assembly.

Figure 3:
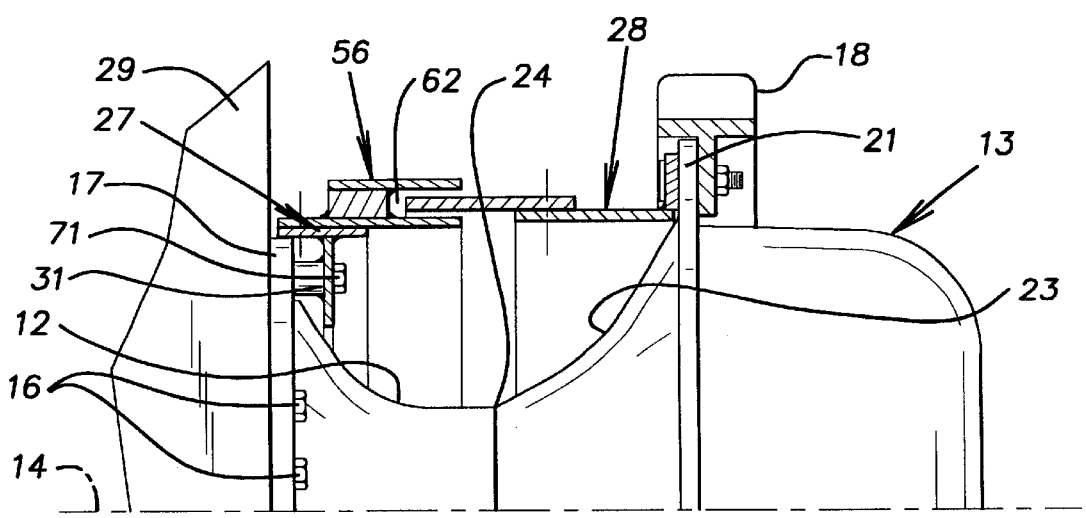
FIG. 3 is a cross sectional partial view of the guard of the invention taken in a vertical plane parallel to the rotational axis of the track chain sprocket.
Figure 4:
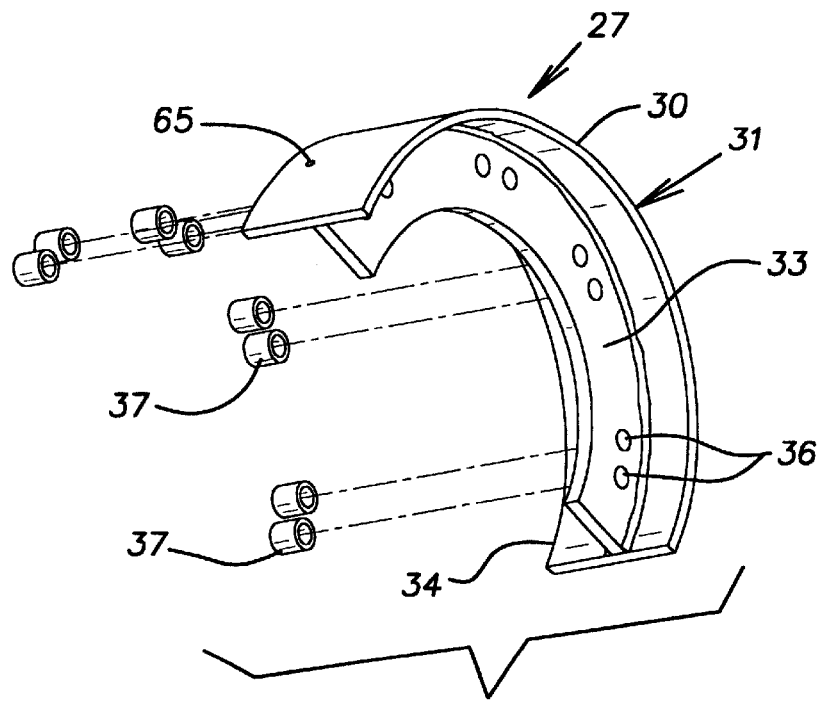
FIG. 4 is an exploded perspective view of an inboard base portion of the guard associated with a non-rotating spindle housing part of the final drive system.

With particular reference to FIG. 3 it will be seen that the assembled guard 26 completely envelopes the annular space between the spindle housing 12 and the sprocket 18. The guard 26 protects the final drive 11 in several ways. It substantially closes off this annular area making it impossible for any large quantity of debris to be entrained with the sprocket or wheel 18. The housing 12 is shielded from abrasion which otherwise occurs when entrained debris rotates with the hub assembly 13 and sprocket 18. Such abrasion can eventually result in destruction of the housing 12 and major repair costs. Importantly, the guard 26 prevents strand-like material such as cable, wire, rope, strapping or even vine-like vegetation from finding its way into the seal assembly 24 between the housing 12 and hub extension 23 where it can ruin the seal with catastrophic results to the internal parts of the drive. The telescoping relation of the inboard and outboard shields 56, 67 at the groove 62 presents a serpentine or labyrinth path to effectively block the passage of any foreign objects tending to be directed towards the annular area enclosed by the guard 26. As shown, the radial clearances or gaps between the shields 56, 67 is small compared to the axial length of such clearances or gaps. Where the guard 26 is exposed to a particularly hostile environment the shields 56, 57 may be eventually consumed by abrasion but this is preferable to destruction of the housing 12 or seal assembly 24 since these elements can be easily removed and replaced with new units at significantly less cost. Steel bands, not shown, can be suitably fastened around the rows of bolts 70, 74.

Figure 8:
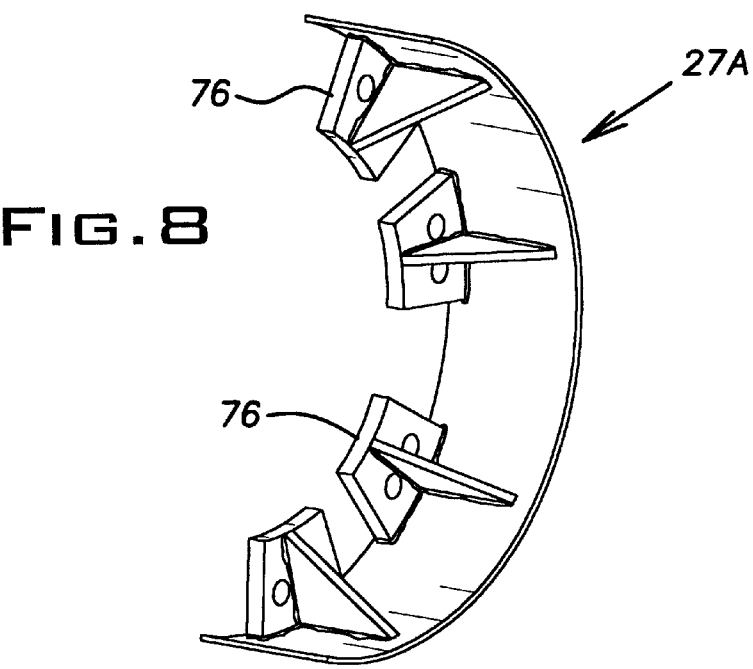
FIG. 8 is a fragmentary perspective view of a modified form of an inboard base portion associated with the non-rotating housing part of the final drive system.

An alternative construction of the inboard guard base portion 27A is illustrated in FIG. 8. In this arrangement, the flange 33 is replaced by a plurality of relatively short arcuate brackets 76. Original bolts holding the housing 12 to the machine frame 29 at the locations of the brackets 76 are removed. With the modified guard base portion 27A in place substitute somewhat longer bolts are assembled through holes in the brackets 76 into the machine frame.

Figure 9:
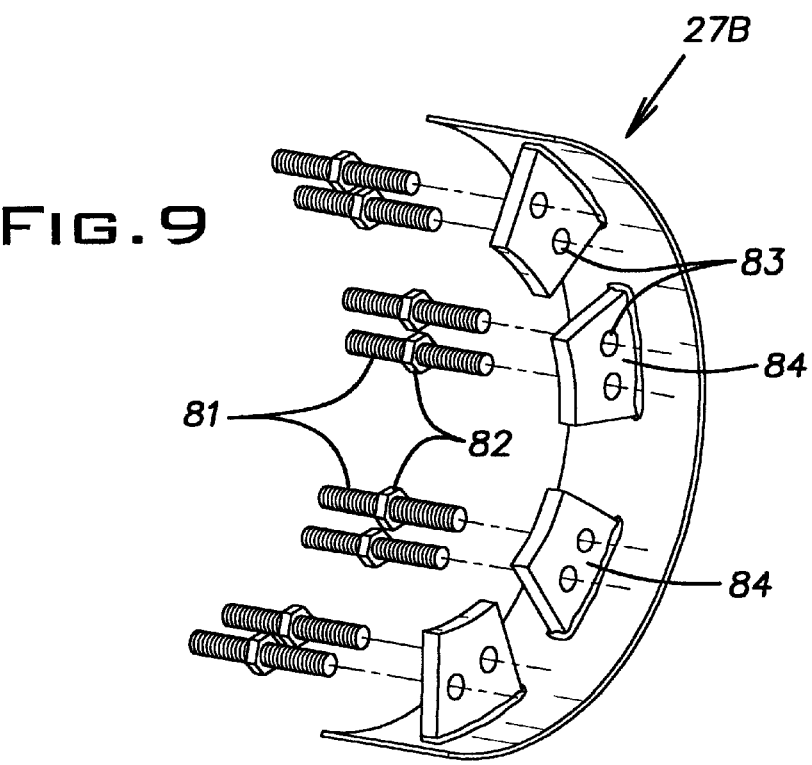
FIG. 9 is a perspective view of specialized bolts used with still another form of an inboard base portion of the guard of the invention.

FIG. 9 illustrates still another variant of the invention where special bolts 81 are substituted for the original bolts 16 mounting the housing 12. The bolts 81 are threaded on opposite sides of a central hex head 82. The bolts 81 are tightened onto the housing and thereafter the inboard guard base portion 27B is installed by assembling it so that the ends of the special bolts 81 extend through holes 83 in a flange 84 and nuts are thereafter tightened onto these ends. It will be understood that as many as all of the original housing mounting bolts 16 can be exchanged with the double ended bolts 81 where a suitable number of holes 83 are provided in the inboard guard portion flange 84. The substitution of bolts can be done one or a few at a time so that the static forces on the housing 12 are safely held by the remaining bolts.

It will be understood that when either guard base portion 27 or 28 is being assembled, a large number of the original bolts 16, 22 are left in place at circumferentially spaced locations on the housing 12 or hub assembly 13. In all cases, bolts holding the housing 12 or sprocket 18 in place will preferably exist at spaced locations in an arc greater than 180° on either of these circular elements.

Figure 10:
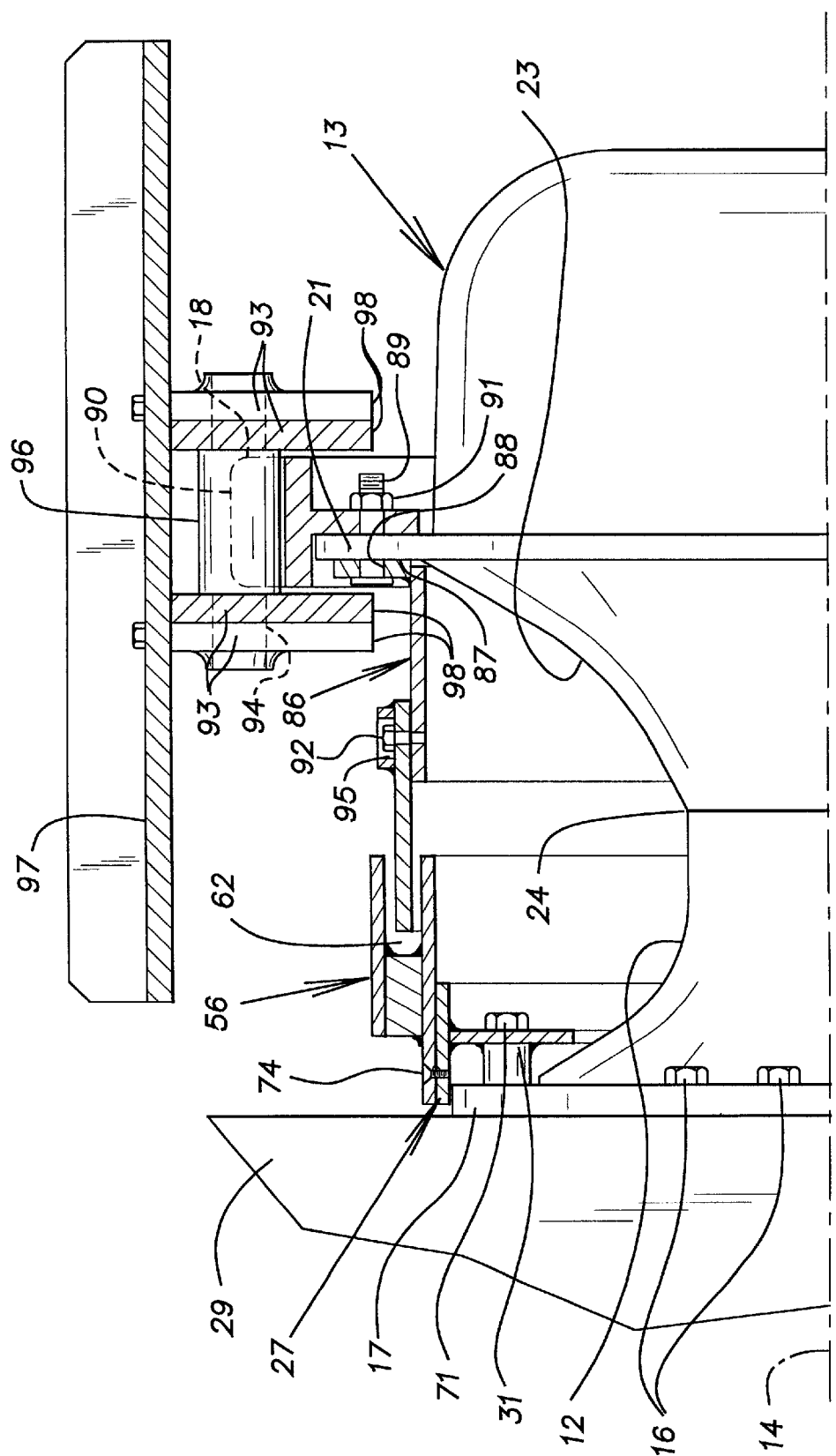
FIG. 10 is a view similar to FIG. 3 illustrating a modified outboard base portion of the guard and showing the relationship of the guard to the track.
Figure 11:
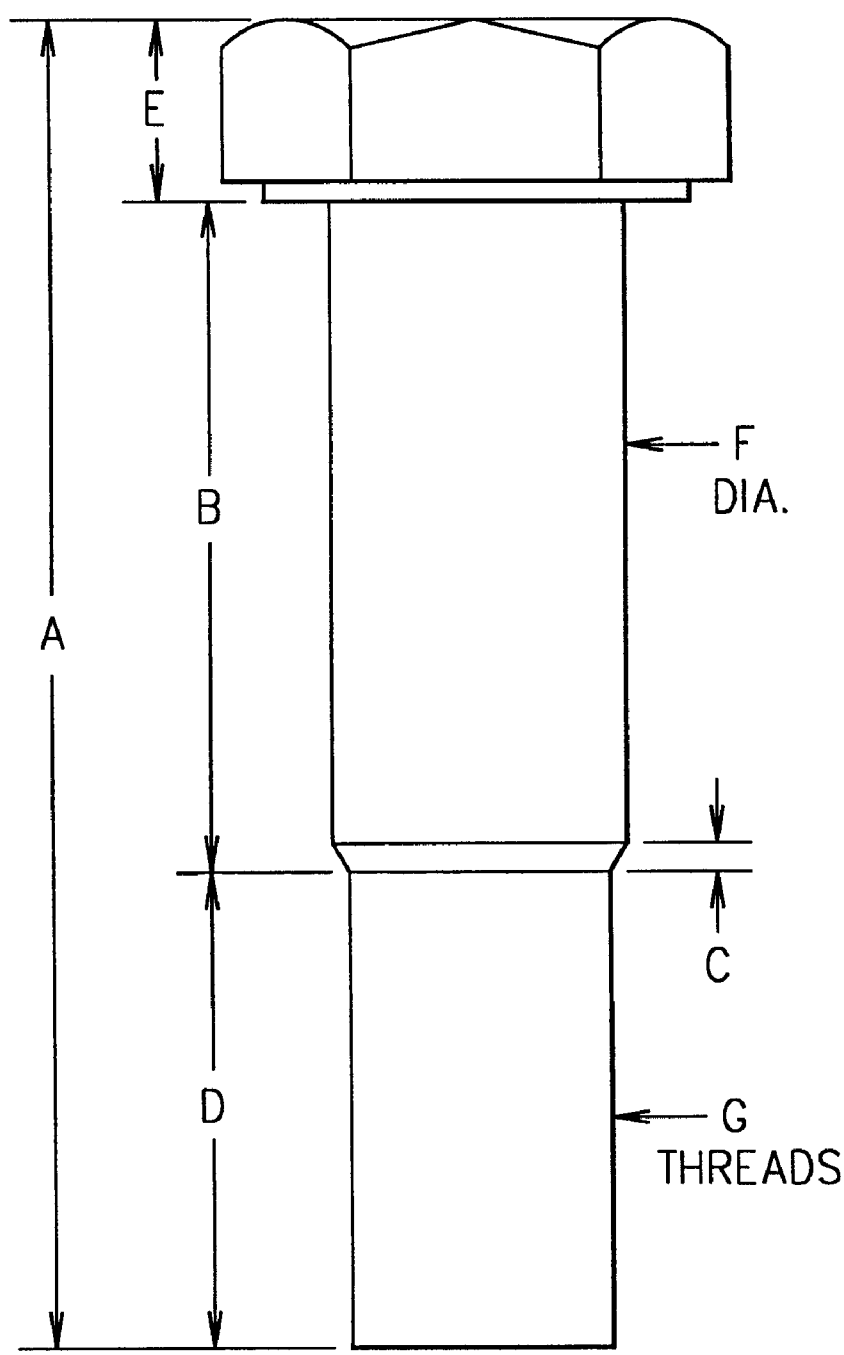
FIG. 11 is a representation of a generalized sprocket segment and guard mounting bolt of the invention.

FIG. 10 illustrates a modified form of an outboard base portion 86 of the guard 26. Various parts of the guard shown in FIG. 10 that are the same as or similar to the parts illustrated in FIG. 3 and described hereinabove are given the same reference numerals. An outboard base portion 86 has semi-circular flanges 87 extending radially outwardly from the half shells 51, 52. The flanges 87 have axially oriented holes 88 aligned with the bolt holes of the sprocket segments 19 and hub flange 21. Special sprocket segment and guard mounting bolts 89, described below, are assembled through the guard flange holes 88, the hub flange 21 and sprocket segments 19 and are tightened with nuts 91 to secure the outboard base portion 86 in place. Hex head bolts 92, serving the function of the flat head bolts 70 of FIG. 3 to hold the outboard shield 67 in place, can be protected from abrasion and other damage by semi-circular steel bands 95 welded to the exterior of the shield 67 and provided with clearance holes for the heads of these bolts.

FIG. 10 illustrates the general relationship of the track 66 to the final drive 11 and guard 26. The corresponding arrangement on the other side of the vehicle 11 is symmetrical. As is common in the industry, the track 66 comprises an endless loop of links 93 interconnected by pins 94 assembled through bushings 96. The track 66 also includes shoes or pads 97 bolted or otherwise fixed to the links 93. The track shoes engage the ground on which the vehicle 10 operates. At each side of the vehicle 10, the track 66 is trained around the drive sprocket wheel 18 and lower idler wheels 15 and 20. As shown in FIG. 10, the track shoes 97 extend inboard and outboard of the sprocket 18 with the inboard portions covering, i.e. encircling, substantially all of the guard 26. The radially innermost or smallest path of the track 66 around the sprocket 18 is taken by inward facing surfaces 98 of the links 93. The guard 26 accommodates movement of the track 66 along this path by configuring the bolts 89 and flange members 87 (or the bolts 54 and flanges 53 of FIG. 3) to lie within the width of the teeth 90 of the sprocket 18 (i.e. within the planes of the radial faces of the teeth 90) and the outboard base portion 28 to lie radially within but relatively close to this path. Inboard of the track links 93, the guard 26 increases in diameter so that it is near the underside of the track shoes 97.

The ability of the guard 26 to avoid excessive build-up of material around it is not fully understood. It is believed that the track 66 by its close proximity to the guard is able to "scrub" or knock off material when it starts to build-up on the guard. Additionally, the relatively large diameter of the guard as compared, for example, to the diameter of the housing and hub at the seal assembly 24 reduces the tendency of strand-like material to wrap several times around the guard because its circumference is relatively large. Additionally, the relatively smooth circumferential outer surface of the guard, interrupted only negligibly by the flush or recessed bolts 74, 70 or 92, and the joint lines between the sections of the inboard shield 56 and between the plates of the outboard shield 67.

When the invention is applied to the High Drive models built by Caterpillar, Inc., the guard parts can be efficiently mounted on the sprocket wheel with bolts having the following approximate dimensions (inches):

TABLE

| MODEL | A SHANK LENGTH | B BEVEL LENGTH | C THREAD LENGTH | D HEAD LENGTH | E SHANK LENGTH | F THREAD DIAMETER/ DIAMETER | G THREAD NUMBER OF PITCH | OVERALL BOLTS/SIDE |
|---|---|---|---|---|---|---|---|---|
| D4H, D5M   | 2.272 | 1.272 | .180 | .707  | .31  | .675  | 5/8-18   | 20 |
| D5H; D6M,H,R | 2.437 | 1.437 | .180 | .812  | .31  | .675  | 5/8-18   | 23 |
| D7H,R; D8N,R | 2.875 | 1.687 | .187 | 1.00  | .31  | .801  | 3/4-16   | 25 |
| D8L        | 3.062 | 1.687 | .187 | 1.187 | .31  | .801  | 3/4-16   | 27 |
| D9N,R      | 3.312 | 2.00  | .187 | 1.120 | .31  | .937  | 7/8-14   | 30 |
| D9L        | 3.50  | 2.120 | .250 | 1.120 | .437 | .930  | 7/8-14   | 27 |
| D10N       | 3.875 | 2.437 | .187 | 1.250 | .375 | 1.056 | 1-14     | 30 |
| D11        | 4.28  | 2.937 | .187 | 1.45  | .410 | 1.18  | 1-1/4-14 | 32 |

The dimensions given above represent a shortening of the head length and a lengthening of the shank compared to factory-supplied bolts. Typically, the factory bolts have head lengths greater than 50% of their shank diameters while suitable geometry for the present invention involves bolt head lengths shorter than 50% of the shank diameter. The disclosed bolt geometry enables the bolts 89 to be not substantially greater in length than the width of the teeth 90 of the sprocket 18 but also to accommodate the thickness of the guard flange 87. The dimensions given for the bolt head length (height) and the shank length are for a flange 87 with an axial thickness of ½". Where other flange thicknesses are used, the dimensions can be suitably modified. Accordingly, length dimensions given above are approximate and can be modified to account for different thicknesses of the flange 87 which can be reduced to ¼" for example in the smaller machines. Similarly, the diameter of the shanks can vary according to industry standards for like finish bolts. Additionally, if desired, the bolts can have a thread diameter increased from that shown up to the diameter of the respective shank. The heads of the bolts 89 have hexagonal cross-sections of standard size.

Various modifications of the guard of the invention are envisioned. Routine changes can involve welding various parts or their equivalents together rather than bolting or making such parts integral with others. It is desirable, as with the disclosed arrangement of the invention, that at least a portion of the guard can be disassembled to provide access to the bolts retaining the spindle housing in place on the frame. This permits the established practice of servicing the planetary drive of the sprocket hub by simultaneously removing both the spindle housing and the sprocket hub. The invention is useful with a variety of track-type vehicles including both loaders and bulldozers with conventional drive sprocket wheels near ground level.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A track mounted vehicle including a frame carried on a pair of endless tracks, each track being mounted on at least two relatively large wheels, one of said wheels being a drive sprocket, each track having ground engaging shoe surfaces on its outside and having surfaces on its inside including sprocket engaging surfaces, the drive sprocket having a hub rotationally supported on a non-rotating spindle that is cantilevered from the frame of the vehicle, a seal between the spindle and the sprocket hub, and a guard having a hollow interior and extending in a zone between the sprocket and the spindle, the guard being generally circular and encircling the seal, the guard having a relatively large diameter that is relatively close to a diameter of a path of the inside surfaces of the track as it moves over the drive sprocket whereby the track is able to dislodge material tending to accumulate on the guard and the relatively large diameter of the guard inhibits the wrapping of strands of material around the guard.

2. A vehicle as set forth in claim 1, wherein the guard is fabricated of steel elements, said guard forming a gap between said steel elements rotating with the sprocket and said steel elements stationary with the spindle.

3. A vehicle as set forth in claim 2, wherein the clearance between the gapped elements is less than the length of any path between said elements along which foreign material is required to pass to enter the interior of the guard.

4. A vehicle as said forth in claim 3, wherein the path between the steel elements has a greater length in the axial direction than in the radial direction.

5. A vehicle as set forth in claim 4, wherein said gap is within a closed path around said wheels followed by the track.

6. A vehicle as set forth in claim 1, wherein said guard has axially extending rotational and stationary parts, said rotational and stationary parts being associated respectively with the sprocket and with the spindle and having outer exposed surface areas the track extending over at least a major portion of said exposed surface areas.

7. A vehicle as set forth in claim 1, wherein said spindle is mounted on said frame with a plurality of bolts surrounding the axis of rotation of the sprocket, said guard including a portion that has an assembled position surrounding the axis of rotation of the sprocket and is removable from the assembled position while said sprocket remains on said spindle to provide access for removal of said bolts.

8. A vehicle as set forth in claim 1, wherein the diameter of the guard adjacent the sprocket is relatively close to the minimum diameter of the track as it passes over the sprocket, the diameter of the guard maintaining at least this diameter as it extends axially towards said frame.

9. A vehicle as set forth in claim 1, wherein an exterior diameter of the guard remote from the track is greater than a diameter of the guard adjacent the sprocket.

10. A track mounted vehicle including a frame, the frame having on each side a non-rotating spindle assembly secured to the frame by bolts, a drive including a sprocket hub on the spindle assembly outboard of the spindle assembly for rotation about an axis, a sprocket secured to the hub by bolts, a seal between the spindle and the sprocket hub, a guard surrounding and protecting the seal from debris including strands otherwise tending to wrap the area of the seal, the guard being retained in position around said seal by at least some of said bolts.

11. A vehicle as set forth in claim 10, wherein said guard is retained in position by bolts securing said spindle.

12. A vehicle as set forth in claim 10, wherein said guard i s retained by bolts securing said sprocket.

13. A vehicle as set forth in claim 10, wherein said guard is retained by bolts securing both said spindle and said sprocket.

14. A vehicle as set forth in claim 10, wherein said guard includes an annular body extending away from said sprocket towards said spindle, flange structure fixed on said body adjacent said sprocket, said bolts retaining said flange structure fixed on said sprocket.

15. A vehicle as set forth in claim 14, wherein said bolts have heads adjacent said flange structure, shanks projecting through said hub and said sprocket, and threaded ends projecting out of said sprocket, and nuts threaded onto the threaded ends of said bolts towards said sprocket.

16. A vehicle as set forth in claim 15, wherein said sprocket has teeth disposed on its periphery, a length of said bolts being less than a width of said teeth.

17. A vehicle as set forth in claim 16, wherein said bolt heads have an axial length of less than ½ the diameter of their shank.

18. A kit for installing a guard on a drive sprocket of a track mounted vehicle comprising a plurality of threaded bolts selected from one of the sets with the following nominal, approximate dimensions (in inches):

set 1 having a shank diameter of 6.75, a head length of 0.31 and an overall length of 2.272;

set 2 having a shank diameter of 0.675, a head length of 0.31 and an overall length of 2.437;

set 3 having a shank diameter of 0.801, a head length of 0.31 and an overall length of 2.875;

set 4 having a shank diameter of 0.801, a head length of 0.31 and an overall length of 3.062;

set 5 having a shank diameter of 0.937, a head length of 0.31 and an overall length of 3.312;

set 6 having a shank diameter of 0.930, a head length of 0.437 and an overall length of 3.50;

set 7 having a shank diameter of 1.056, a head length of 0.375 and an overall length of 3.875; and set 8 having a shank diameter of 1.18, a head length of 0.410 and an overall length of 4.28.

19. A vehicle as set forth in claim 1, wherein said guard is retained in position by bolts securing said spindle to said frame.

20. A vehicle as set forth in claim 1, wherein said guard is retained by bolts securing said sprocket to said hub.

21. A vehicle as set forth in claim 1, wherein said guard is retained by bolts securing both said spindle to said frame and said sprocket to said hub.

22. A vehicle as set forth in claim 1, wherein said guard includes an annular body extending away from said sprocket towards said spindle, flange structure fixed on said body adjacent said sprocket, and bolts retaining said flange structure fixed on said sprocket and said sprocket on said hub.

23. A vehicle as set forth in claim 22, wherein said bolts have heads adjacent said flange structure, shanks projecting through said hub and said sprocket and threaded ends projecting out of said sprocket, and nuts threaded onto the threaded ends of said bolts towards said sprocket.

24. A vehicle as set forth in claim 23, wherein said sprocket has teeth disposed on its periphery, a length of said bolts being less than a width of said teeth.

25. A vehicle as set forth in claim 24, wherein said bolt heads have an axial length of less than ½ the diameter of their shank.

26. A vehicle as set forth in claim 10, wherein the guard forms a labyrinth seal between rotating and non-rotating parts, the labyrinth seal having a clearance between said rotating and non-rotating parts that is small in comparison to any potential path between said rotating and non-rotating parts for passage of debris past said guard into said seal.

27. A vehicle as set forth in claim 26, wherein said labyrinth seal limits said potential path primarily to directions parallel to the axis of rotation of said sprocket.

28. A vehicle as set forth in claim 10, wherein the guard is fabricated of steel elements, said guard forming a gap between said steel elements rotating with the sprocket and said steel elements stationary with the spindle.

29. A vehicle as set forth in claim 28, wherein the clearance between the gapped elements is less than the length of any path between said elements along which foreign material is required to pass to enter the interior of the guard.

30. A vehicle as said forth in claim 28, wherein the path between the steel elements has a greater length in the axial direction than in the radial direction.

31. A vehicle as set forth in claim 30, wherein said gap is within a closed path around said wheels followed by the track.

32. A vehicle as set forth in claim 10, wherein said guard has axially extending rotational and stationary parts, said rotational and stationary parts being associated respectively with the sprocket and with the spindle and having outer exposed surface areas, the track extending over at least a major portion of said exposed surface areas.

33. A vehicle as set forth in claim 10, wherein said guard includes a portion that has an assembled position surrounding the axis of rotation of the sprocket and is removable from the assembled position while said sprocket remains on said spindle to provide access for removal of said bolts.

34. A vehicle as set forth in claim 10, wherein the diameter of the guard adjacent the sprocket is relatively close to the minimum diameter of the track as it passes over the sprocket, the diameter of the guard maintaining at least this diameter as it extends axially towards said frame.

35. A vehicle as set forth in claim 10, wherein an exterior diameter of the guard remote from the track is greater than a diameter of the guard adjacent the sprocket.

36. A track mounted vehicle including a frame carried on a pair of endless tracks, each track being mounted on at least two relatively large wheels, one of said wheels being a drive sprocket, each track having ground engaging shoe surfaces on its outside and having surfaces on its inside including sprocket engaging surfaces, the drive sprocket having a hub rotationally supported on a non-rotating spindle that is cantilevered from the frame of the vehicle, a seal between the sprocket hub and the spindle, and a guard having a hollow interior and extending in a zone between the sprocket and the spindle, the guard being generally circular and arranged to encircle and protect the seal, the guard being constructed and arranged to avoid a direct radial path for entrance of debris into the interior of the guard and the area of the seal where it could otherwise accumulate and result in destruction of the seal.

37. A vehicle as set forth in claim 36, wherein the guard is fabricated of steel elements, said guard forming a gap between said steel elements rotating with the sprocket and said steel elements stationary with the spindle.

38. A vehicle as set forth in claim 37, wherein the clearance between the gapped elements is less than the length of any path between said elements along which foreign material is required to pass to enter the interior of the guard.

39. A vehicle as said forth in claim 38, wherein the path between the steel elements has a greater length in the axial direction than in the radial direction.

40. A vehicle as set forth in claim 39, wherein said gap is within a closed path around said wheels followed by the track.

41. A vehicle as set forth in claim 36, wherein said guard has axially extending rotational and stationary parts, said rotational and stationary parts being associated respectively with the sprocket and with the spindle and having outer exposed surface areas, the track extending over at least a major portion of said exposed surface areas.

42. A vehicle as set forth in claim 36, wherein said spindle is mounted on said frame with a plurality of bolts surrounding the axis of rotation of the sprocket, said guard including a portion that has an assembled position surrounding the axis of rotation of the sprocket and is removable from the assembled position while said sprocket remains on said spindle to provide access for removal of said bolts.

43. A vehicle as set forth in claim 36, wherein the diameter of the guard adjacent the sprocket is relatively close to the minimum diameter of the track as it passes over the sprocket, the diameter of the guard maintaining at least this diameter as it extends axially towards said frame.

44. A vehicle as set forth in claim 36, wherein an exterior diameter of the guard remote from the track is greater than a diameter of the guard adjacent the sprocket.

45. A vehicle as set forth in claim 36, wherein said guard is retained in position by bolts securing said spindle to said frame.

46. A vehicle as set forth in claim 36, wherein said guard is retained by bolts securing said sprocket to said hub.

47. A vehicle as set forth in claim 36, wherein said guard is retained by bolts securing both said spindle to said frame and said sprocket to said hub.

48. A vehicle as set forth in claim 36, wherein said guard includes an annular body extending away from said sprocket towards said spindle, flange structure fixed on said body adjacent said sprocket, and bolts retaining said flange structure fixed on said sprocket and said sprocket on said hub.

49. A vehicle as set forth in claim 48, wherein said bolts have heads adjacent said flange structure, shanks projecting through said hub and said sprocket and threaded ends projecting out of said sprocket, and nuts threaded onto the threaded ends of said bolts towards said sprocket.

50. A vehicle as set forth in claim 49, wherein said sprocket has teeth disposed on its periphery, a length of said bolts being less than a width of said teeth.

51. A vehicle as set forth in claim 50, wherein said bolt heads have an axial length of less than ½ the diameter of their shank.

52. A vehicle as set forth in claim 36, wherein the guard forms a labyrinth seal between rotating and non-rotating parts, the labyrinth seal having a clearance between said rotating and non-rotating parts that is small in comparison to any potential path between said rotating and non-rotating parts for passage of debris past said guard into said seal.

53. A vehicle as set forth in claim 52, wherein said labyrinth seal limits said potential path primarily to directions parallel to the axis of rotation of said sprocket.

54. A vehicle as set forth in claim 36, wherein said guard has parts bolted to one of the spindle or sprocket.

55. A vehicle as set forth in claim 36, wherein the outer surface of the guard is adjacent a path taken by the inside surface of the track as it passes around the sprocket whereby the track is able to dislodge material tending to accumulate on the outer surface of the guard.

56. A track mounted vehicle including a frame carried on a pair of endless tracks, each track being mounted on at least two relatively large wheels, one of said wheels being a drive sprocket, each track having ground engaging shoe surfaces on its outside and having surfaces on its inside including sprocket engaging surfaces, the drive sprocket having a hub rotationally supported on a non-rotating spindle that is cantilevered from the frame of the vehicle, a seal between the sprocket hub and the spindle, at least one of said sprocket and spindle components being bolted to the frame or sprocket hub, respectively, and a guard having a hollow interior and extending in a zone between the sprocket and the spindle, the guard being generally circular and encircling the seal to protect it from damage caused by debris carried by rotating parts associated with the sprocket or track, the guard being mounted in place by bolts serving to fix one of said spindle or sprocket in place on the frame or sprocket hub.

57. A vehicle as set forth in claim 56, wherein the guard is fabricated of steel elements, said guard forming a gap between said steel elements rotating with the sprocket and said steel elements stationary with the spindle.

58. A vehicle as set forth in claim 57, wherein the clearance between the gapped elements is less than the length of any path between said elements along which foreign material is required to pass to enter the interior of the guard.

59. A vehicle as said forth in claim 58, wherein the path between the steel elements has a greater length in the axial direction than in the radial direction.

60. A vehicle as set forth in claim 59, wherein said gap is within a closed path around said wheels followed by the track.

61. A vehicle as set forth in claim 56, wherein said guard has axially extending rotational and stationary parts, said rotational and stationary parts being associated respectively with the sprocket and with the spindle and having outer exposed surface areas, the track extending over at least a major portion of said exposed surface areas.

62. A vehicle as set forth in claim 56, where in said spindle is mounted on said frame with a plurality of bolts surrounding the axis of rotation of the sprocket, said guard including a portion that has an assembled position surrounding the axis of rotation of the sprocket and is removable from the assembled position while said sprocket remains on said spindle to provide access for removal of said bolts.

63. A vehicle as set forth in claim 56, wherein the diameter of the guard adjacent the sprocket is relatively close to the minimum diameter of the track as it passes over the sprocket, the diameter of the guard maintaining at least this diameter as it extends axially towards said frame.

64. A vehicle as set forth in claim 56, wherein an exterior diameter of the guard remote from the track is greater than a diameter of the guard adjacent the sprocket.

65. A vehicle as set forth in claim 56, wherein said guard is retained in position by bolts securing said spindle to said frame.

66. A vehicle as set forth in claim 56, wherein said guard is retained by bolts securing said sprocket to said hub.

67. A vehicle as set forth in claim 56, wherein said guard is retained by bolts securing both said spindle to said frame and said sprocket to said hub.

68. A vehicle as set forth in claim 56, wherein said guard includes an annular body extending away from said sprocket towards said spindle, flange structure fixed on said body adjacent said sprocket, and bolts retaining said flange structure fixed on said sprocket and said sprocket on said hub.

69. A vehicle as set forth in claim 68, wherein said bolts have heads adjacent said flange structure, shanks projecting through said hub and said sprocket and threaded ends projecting out of said sprocket, and nuts threaded onto the threaded ends of said bolts towards said sprocket.

70. A vehicle as set forth in claim 69, wherein said sprocket has teeth disposed on its periphery, a length of said bolts being less than a width of said teeth.

71. A vehicle as set forth in claim 70, wherein said bolt heads have an axial length of less than ½ the diameter of their shank.

72. A vehicle as set forth in claim 56, wherein the guard forms a labyrinth seal between rotating and non-rotating parts, the labyrinth seal having a clearance between said rotating and non-rotating parts that is small in comparison to any potential path between said rotating and non-rotating parts for passage of debris past said guard into said seal.

73. A vehicle as set forth in claim 72, wherein said labyrinth seal limits said potential path primarily to directions parallel to the axis of rotation of said sprocket.

74. A vehicle as set forth in claim 56, wherein said guard has parts bolted to one of the spindle or sprocket.

75. A vehicle as set forth in claim 56, wherein the outer surface of the guard is adjacent a path taken by the inside surface of the track as it passes around the sprocket whereby the track is able to dislodge material tending to accumulate on the outer surface of the guard.

* * * * *